May 27, 1969  E. LESCURE  3,446,392
RIM FOR COOKING VESSEL
Filed June 30, 1966  Sheet 1 of 2
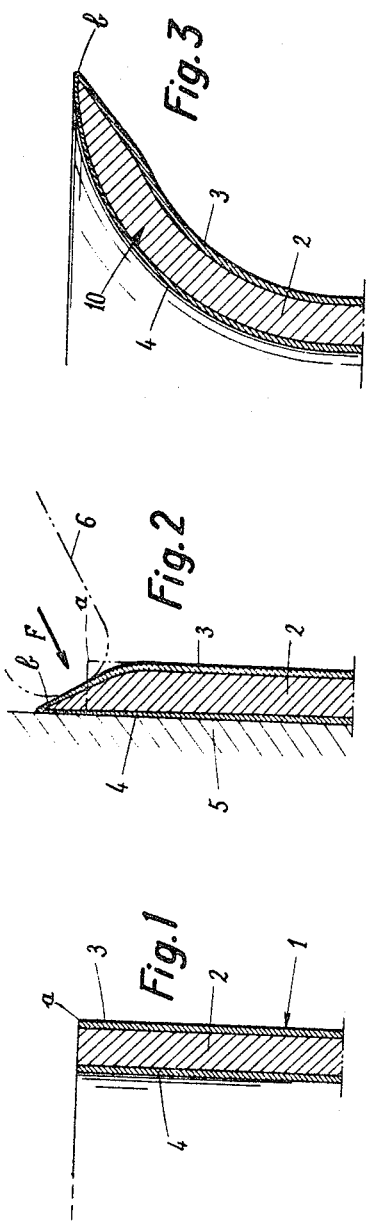
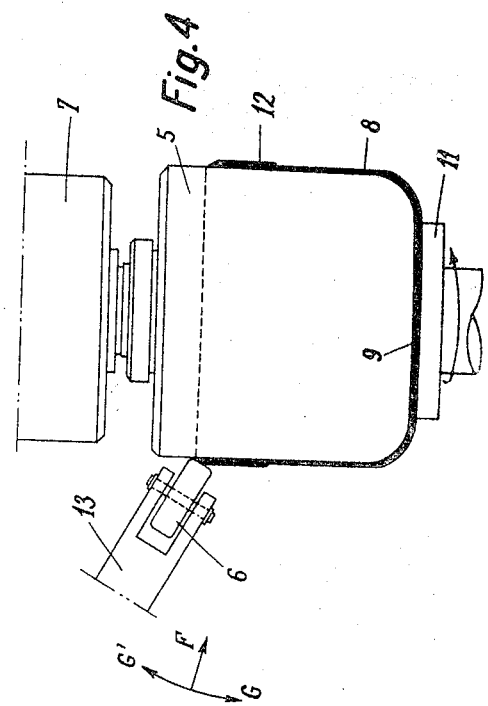
INVENTOR
ERIC LESCURE
By Young + Thompson
Attys

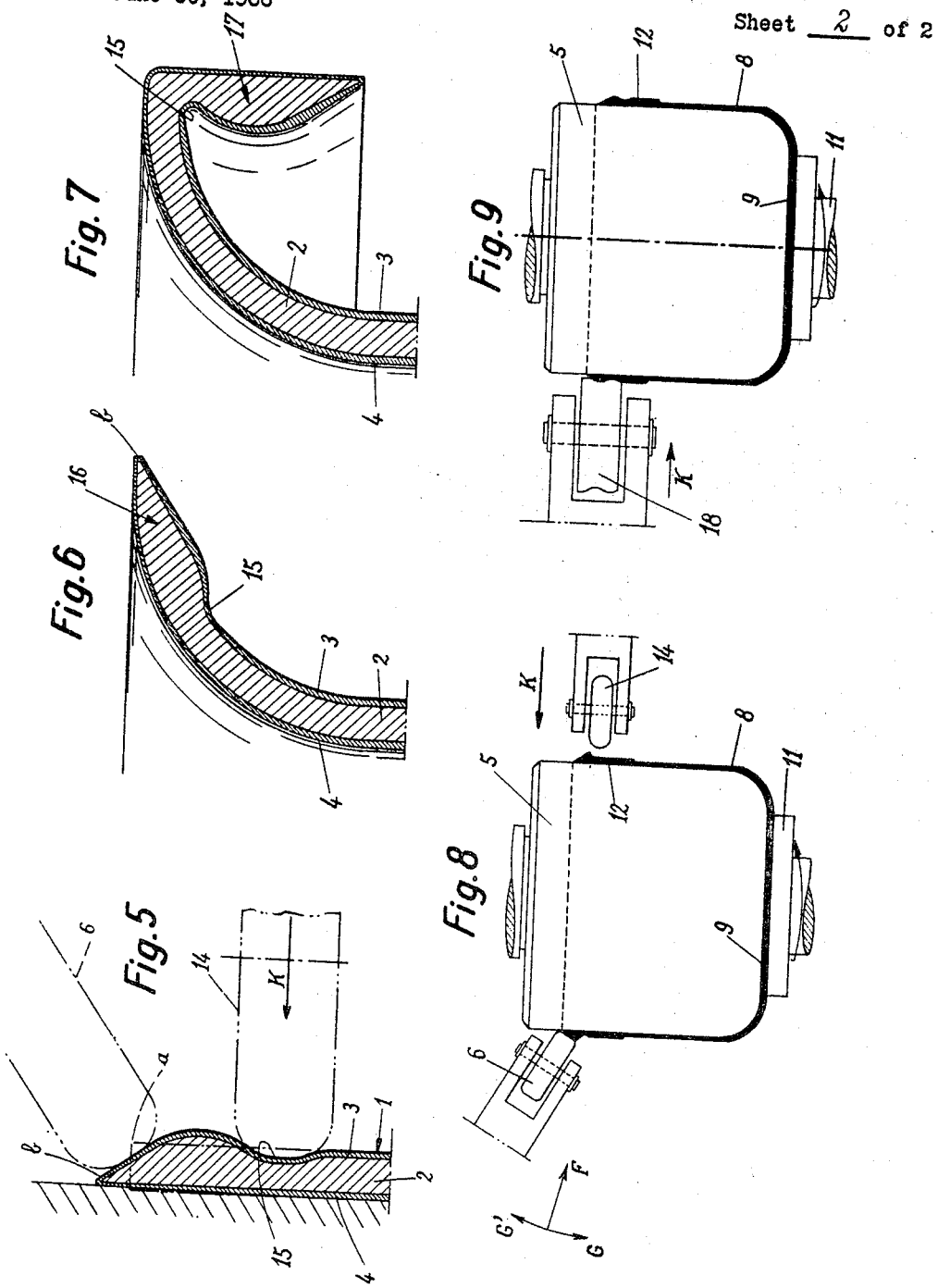

United States Patent Office 3,446,392
Patented May 27, 1969

3,446,392
RIM FOR COOKING VESSEL
Eric Lescure, Dienay, Cote d'Or, France
Filed June 30, 1966, Ser. No. 561,927
Claims priority, application France, July 7, 1965,
23,754
Int. Cl. B65d 25/14
U.S. Cl. 220—63            4 Claims

ABSTRACT OF THE DISCLOSURE

A cooking vessel comprises a base of an oxidizable metal which is jacketed between two layers of stainless steel. At the rim, the base tapers to a sharp edge and the jacketing layers are welded together along this edge and overlap the edge.

---

The present invention relates to an improved rim for cooking vessels made of a composite metal of the type including a core of oxidable metal, plated on each side with a foil of stainless metal. This invention also relates to the method of manufacture of such rims. As used in the present application, the term cooking vessels applies as well to saucepans, braising pans or the like as to pressure cookers or other cookers.

It is already known to use for making such cooking vessels composite metal sheets comprising for example a core of mild steel sandwiched between thin layers of stainless steel. However, difficulties are met to protect the rims of such vessels against oxidation, since the attack of the core by external agents must be prevented. According to a known method, a recess is provided along the vessel edge across the whole thickness of the oxidable core, one of the stainless metal layers being also cut off, while the other layer is flanged thereover.

However this method requires a rather lengthy, intricate machining of the metal, thereby increasing the cost of the vessel. Moreover, the two stainless layers can scarcely be well united together. It is therefor an object of the method according to the invention to obviate these drawbacks by providing in the composite sheet edge an arrangement involving no metal removal.

According to the invention, the rim for cooking vessels made from a composite metal sheet is characterized in that the core of the composite sheet is thinned down near its periphery and in that the layers of stainless metal are united along the edge of the thus thinned down portion of the core.

The tapering rim thus obtained may be either curved outwards to facilitate the pouring out from the vessel, or turned down to lie parallel to the vessel axis, so as to form a flange acting as a strengthening rib.

The method of manufacture of the present rim is characterized in that one of the stainless metal layers is extruded about the periphery of the sheet, by pressing thereon a tool, such as a roller, towards the other layer, while causing plastic flow of said two layers and of the underlying oxidable core. This pressing step may for example be effected by placing the vessel body on the mandrel of a lathe and by fitting the roller on the lathe slide.

Further features of the invention will still result from the following description.

In the accompanying drawings, given by way of non-restrictive examples:

FIG. 1 is an enlarged cross sectional view of the terminal portion of a composite metal sheet before machining.

FIG. 2 is a similar view showing the first step of the machining process of said sheet.

FIG. 3 is an axial sectional view of the finished rim.

FIG. 4 is a diagrammatic elevational view on a reduced scale illustrating a practical method of carrying on the aforesaid machining steps.

FIG. 5 is an axial sectional view on an enlarged scale illustrating an alternative method of carrying out the machining steps.

FIG. 6 is a similar view of the finished rim according to a first embodiment.

FIG. 7 is a view similar to FIG. 6, showing a second embodiment of the rim.

FIG. 8 is a view on a reduced scale showing the manner in which the machining step in FIG. 5 is practically carried out.

FIG. 9 is a view similar to FIG. 8 showing an alternative method.

Referring to FIG. 1 of the accompanying drawings there is shown at 1 a composite metal sheet to be used for making a cooking vessel such as a pan, pressure cooker or the like and which has been stamped for this purpose into a cylindrical volume.

The sheet 1 comprises in a known manner a core 2 of oxidable metal such as mild steel, plated with two thin layers 3, 4 of a metal resisting to corrosion (e.g., stainless steel).

According to the present invention, to form the rim of the vessel, controlled flow of the metal is caused to occur in the terminal portion, or periphery, of the casing thus formed, so that the layers 3 and 4 will merge together, confining the core 2 therebetween.

For this purpose, the casing can be fitted on a cylindrical mandrel 5 and subjected to the action of a roller 6 having a rounded profile as shown and acting along a direction F oblique to the vessel axis and engaging the composite sheet 1 substantially at the level of the outer edge a of the periphery. The progress of the roller 6 in the direction F, which is advantageously combined with a transverse motion of this tool and, if required, with some variation of its obliquity across G–G′ (FIG. 4), brings about an aggregate flow of the metal sheets 2, 3 and 4 which become thinner by stretching along the mandrel 5, so that the stainless layers 3 and 4 finally come to join all around the terminal edge b of the thinned down portion of the core 2. By means of this arrangement, the vessel periphery is then protected against corrosion.

The fact that plastic flow can be induced by means of an external roller not only in the core 2 and outer layer 3, but also in the inner layer 4 of the sheet 1, so that the layers 3 and 4 can join beyond the edge b under the effect of pressure is to be considered as a remarkable result.

To facilitate the pouring out, it is moreover contemplated, according to the present invention, to curve outwards the vessel periphery thus provided, by means of a pressing step on a die of suitable profile. There is thus provided a rim 10 shown in FIG. 3, which facilitates the pouring out of the liquids contained in the vessel.

FIG. 4 shows a possible method of carrying out the machining step described with reference to FIG. 2. The mandrel 5 is carried by a lathe spindle 7 and the vessel blank, which is diagrammatically shown at 8, has a reinforced bottom 9 clamped by a back-plate 11 and a reinforced periphery 12 subjected to the action of the rounded roller 6, mounted in a bracket 13 which may for instance be a part of the lathe slide.

According to an alternative embodiment of the method according to the invention, after the periphery of the vessel has been curved outwards as before, it is contemplated to turn over said curved periphery so as to form a reinforcing flange which is substantially parallel to the axis of the vessel.

For this purpose the composite sheet 1 is further subjected to the action of a rounded roller 14 (FIG. 5)

acting in a radial direction K and located at a level lower than that of the roller 6, so as to provide a groove 15 in the sheet 1, below the thinned down portion. In this embodiment, the mandrel 5 is assumed to be slightly frustoconical, instead of being cylindrical, so as to facilitate stripping off of the vessel after machining.

In this case also, some degree of aggregate flow occurs within the layers 2, 3 and 4 and by concurrent shiftings of the roller 6 along F and across G-G', the layers 3 and 4 can be caused to join. Preferably, as shown in FIG. 8, the rollers 6 and 14 are located at diametrically opposed positions so as to balance the stresses applied to the mandrel 5.

After removal from the mandrel 5, the thus machined vessel is subjected to a first pressing step which causes the rim 16 thereof to assume the curved position shown in FIG. 6. By a second pressing step, the resulting curved rim 16 is turned over to extend parallel to the vessel axis in such manner as to form a flange 17 (FIG. 7) having a cylindrical outer surface and which is folded about the groove 15 previously formed by the roller 14 in the layer 3. The flange 17 acts to substantially reinforce the vessel, thus allowing the fitting thereon of covers provided with sealing rings, while also facilitating the pouring out of liquids contained in the vessel.

It would still be within the scope of the invention to carry out the aforesaid machining steps, effected with the rollers 6 and 14, by means of a single roller 18 (FIG. 9) having a profile which mates the contour of the finished rim as machined by the individual rollers 6 and 14, this roller 18 being then imparted a simple motion along a radial direction K.

What I claim is:

1. A cooking vessel made from a composite metal sheet comprising a core of oxidizable metal sandwiched between two layers of stainless metal, said vessel comprising a body limited by an outer rim and wherein said core of said composite sheet is thinned down along said rim thereby forming an edge and wherein said two layers of stainless metal are joined together along said core edge thereby overlapping the same.

2. A cooking vessel according to claim 1 wherein said thinned down portion of said composite metal sheet along said rim is curved outwards with respect to said vessel body.

3. A cooking vessel according to claim 1 having an axis of symmetry and wherein said thinned down portion of said composite metal sheet along said rim is curved outwards with respect to said vessel body, said curvature being such that the tangential plane along said rim is substantially perpendicular to said vessel axis of symmetry.

4. A cooking vessel according to claim 1 having an axis of symmetry and wherein said thinned down portion of said composite metal sheet along said rim is curved outwards with respect to said vessel body, said stainless outer sheet and said core of oxidizable metal being thinned so as to form a groove near said rim edge and parallel thereto, and wherein said rim comprises a flange parallel to said symmetry axis and comprised between said groove and said rim outer edge.

References Cited

UNITED STATES PATENTS

| 1,981,915 | 11/1934 | Hormel et al. | 220—63 |
| 2,841,137 | 7/1958 | Chace | 126—390 |

JAMES B. MARBERT, *Primary Examiner.*

U.S. Cl. X.R.

126—390